United States Patent [19]

Shindo et al.

[11] 4,401,567
[45] Aug. 30, 1983

[54] MICROPOROUS POLYETHYLENE HOLLOW FIBERS

[75] Inventors: Mizuo Shindo; Takashi Yamamoto; Osamu Fukunaga; Hisayoshi Yamamori, all of Otake, Japan

[73] Assignee: Mitsubishi Rayon Co., Ltd., Tokyo, Japan

[21] Appl. No.: 281,103

[22] Filed: Jul. 7, 1981

[30] Foreign Application Priority Data

Oct. 14, 1980 [JP] Japan ................................. 55-143135

[51] Int. Cl.³ ........................ B01D 39/00; D02G 3/00
[52] U.S. Cl. ................................ 210/500.2; 428/376; 428/398; 264/209.1
[58] Field of Search ........................... 428/376, 398; 210/500.1, 500.2; 264/41, 209.1, 209.3, 209.5, 264/210.7, 210.8, 561

[56] References Cited

U.S. PATENT DOCUMENTS

| | | | |
|---|---|---|---|
| 3,423,491 | 1/1969 | McLain | 264/49 |
| 3,801,404 | 4/1974 | Druin et al. | 264/210.7 |
| 3,839,240 | 10/1974 | Zimmerman | 264/210.7 X |
| 3,839,516 | 10/1974 | Williams et al. | 264/210.7 X |
| 4,001,367 | 1/1977 | Guthrie | 264/154 |
| 4,020,230 | 4/1977 | Mahoney et al. | 210/500.2 X |
| 4,055,696 | 10/1977 | Kamada et al. | 264/210.8 X |
| 4,055,702 | 10/1977 | Guthrie et al. | 428/398 |
| 4,182,582 | 1/1980 | Youval | 405/45 |

OTHER PUBLICATIONS

Williams et al, A Study of the Sorption and Permeability of Gases and Vapors in Solvent-Drawn Polyethylene, Die Makromolekular Chemie 135, 41–47, (1970).

*Primary Examiner*—Lorraine T. Kendell
*Attorney, Agent, or Firm*—Cushman, Darby & Cushman

[57] ABSTRACT

Porous hollow fibers composed of a high density polyethylene the fibers having rectangular micropores that are oriented in the lengthwise direction of the fibers and having a porosity from 30 to 90% by volume are disclosed. Membranes composed of hollow fibers exhibit a water permeability of greater than 65 (ml/m², hr, mmHg) as well as a human serum albumin permeability of greater than 30%. Such fibers are suited for use as filters, particularly as a membrane for simple fractionation of whole blood into its plasma and cellular components. The hollow fibers are obtained by spinning a high-density polyethylene under a high-draft condition followed by cold stretching and hot stretching, and without the use of any solvent or plasticizer.

9 Claims, 4 Drawing Figures

Fig. 1 OUTER SURFACE
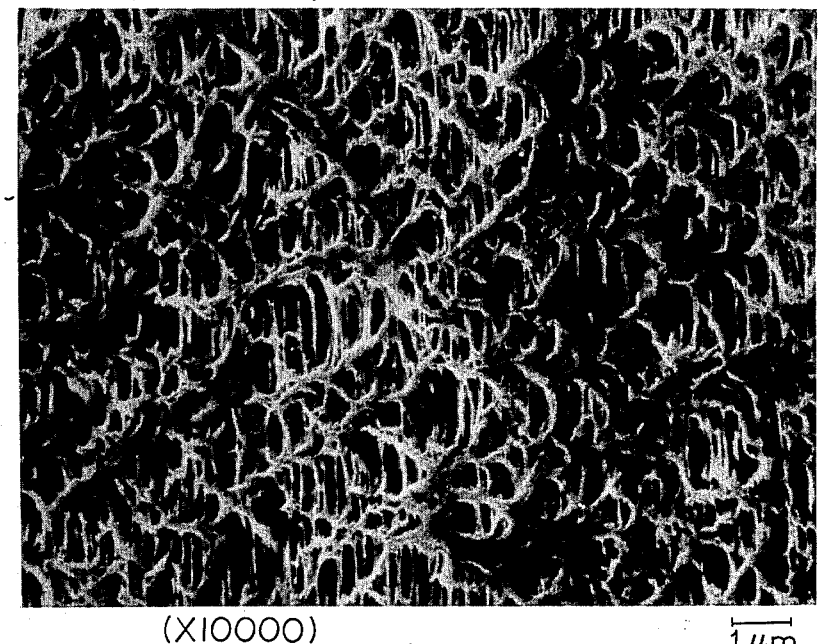
(X10000)  1μm
Fig. 2 INNER SURFACE
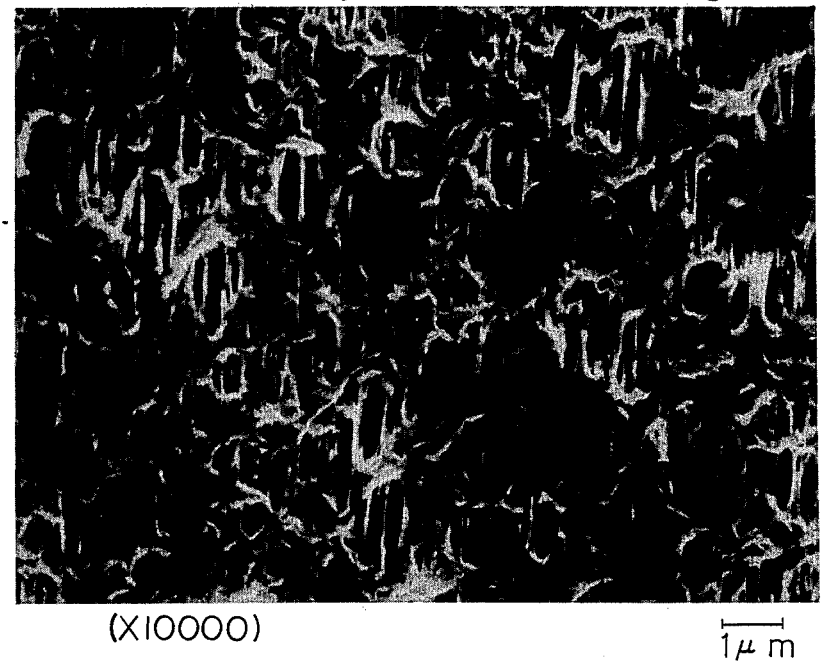
(X10000)  1μm

MICROPOROUS POLYETHYLENE HOLLOW FIBERS

BACKGROUND OF THE INVENTION

The formation of polyethylene into a hollow porous fiber or tube is described in various documents including: U.S. Pat. No. 3,423,491; U.S. Pat. No. 4,020,230; and the Technical Information Bulletin related to porous plastic tubes issued by A. T. Ramoto Plastics, Ltd., Israel (February, 1976), and in the specification of Japanese Patent Application Laid-Open No. 137026/77.

According to U.S. Pat. Nos. 3,423,491 and 4,020,230, porous hollow fibers are prepared by heating and melting a mixture consisting of polyethylene and a specific plasticizer, such as low-molecular weight ester, sulfolane, or polyglycol, forming the molten mixture into a hollow product, and thereafter extracting the plasticizer with a selective solvent which does not dissolve the polyethylene but does dissolve the plasticizer, so that the fibers will contain pores that penetrate therethrough. Namely, according to U.S. Pat. No. 3,423,491, porous hollow fibers which exhibit a de-salting of greater than 75% and which have properties suited for reverse osmosis, are obtained depending upon the conditions in which the plasticizer is extracted. According to U.S. Pat. No. 4,020,230, furthermore, there are produced porous polyethylene hollow fibers having a maximum pore radius of up to about 50 angstroms, which are capable of inhibiting the passage of more than 95% of albumin which has a radius of gyration about 30 angstroms.

U.S. Pat. No. 4,020,230 further teaches that it is not suitable to assess the diameters of effective micropores of the membrane which serves as a separating member relying upon a pore size observed by an electron microscope, but it is desirable to judge the pore size by a filtration experiment using a solution of a solute having a known molecular dimension, for instance an albumin solution.

In fact, although the distribution of pore size according to the above-mentioned invention is estimated to be from about 0.1 to 1 microns as observed through an electron microscope, a maximum diameter of the effective pores is less than 0.005 micron (50 angstroms) if measured by the filtration experiment. Accordingly, the distribution of pore size observed by the electron microscope does not exactly correspond to the function as a practical separating member.

Such a phenomenon is usually experienced in developing separating materials. That is to say, the distribution of micropores calculated relying upon a static means, such as mercury porosimeter or electron microscope, results in a value that substantially deviates from the diameters of effective pores of the separating materials. Therefore, in order to more correctly reflect the porous structure of the membrane and to practically evaluate the separating materials relying upon the structure of the porous membrane, it is highly desirable to measure the filtering characteristics of the membrane for a substance which has a known particle size.

On the other hand, the Technical Information Bulletin issued by A. T. Ramoto Plastics, Ltd. of Israel teaches a porous tube which has a large gas permeability, and which consists of a low-density polyethylene or a high-density polyethylene having an inner diameter of 1 to 12 mm and an average pore diameter of 1 to 30 microns. It is believed that the porous tube there described is produced by a process which is disclosed in the specification of U.S. Pat. No. 4,182,582 that was filed by A. T. Ramoto Plastics, Ltd. According to this patent, the polyethylenes and a pore-forming additive are extruded together, the pore-forming additive is extracted in a subsequent step, and fine pores are formed in the wall of the tube in much the same manner as U.S. Pat. Nos. 3,423,491 and 4,020,230 mentioned above. The tube is used chiefly for aerating gases into a liquid. Although there is a description related to the pore size in the Ramoto patent there is no description which deals with the permeability of a solute through the membrane.

The specification of Japanese Patent Application Laid-Open No. 137026/77 describes certain hollow fibers having an average pore diameter of 0.01 to 0.5 microns, that are obtained by melt-spinning a thermoplastic crystalline polymer and that the fibers are oriented in the lengthwise direction. In Example 3 of this document, the only example dealing with polyethylene, the pore diameter ranges from 0.02 to 0.2 micron (measured presumably by the method of mercury porosimetry), and the porosity is 23% at the most. However, there is no description which teaches the permeability of the solute.

Thus the various pore sizes taught in the prior art, i.e., U.S. Pat. No. 4,182,582, does not present practical effective pore size of membrane for separating the solute as disclosed in the specification of U.S. Pat. No. 4,020,230.

As will be apparent from the above-mentioned prior art, the porous hollow fibers composed of polyethylene can be produced by a variety of methods. However, polyethylene hollow fibers have not yet been produced suitable for use as a membrane for fractionating blood components, which membranes exhibit excellent albumin permeability, have a large porosity, have substantial water permeability, and which contain fine pores that penetrate therethrough.

In particular, porous hollow fibers that are obtained from polyethylene without the need to use a solvent or a plasticizer and that have micropores suited for separating blood components, serve as a clean membrane without containing residual solvent or plasticizer that comtaminates blood components being permeated. Further, such porous hollow fibers when employed in an apparatus for separating blood, presents an increased membrane area per unit of apparatus and minimizes the amount of blood that may remain in the apparatus. In this case, the hydrophobic property of the polyethylene does not at all hinder the purpose to which the membrance is put. The hydrophobic property can be suitably converted into a hydrophilic property through treatment with alcohol, an oxidation treatment with ozone, or through any other conventionally known physical and chemical treatment to achieve the characteristic desired.

SUMMARY OF THE INVENTION

A high-density polyethylene having a density of greater than 0.960 and preferably a density of greater than 0.965 is melt-extruded through a nozzle adapted to prepare hollow fibers, and is wound at high draw ratio, i.e., as high as 100 or more and, preferably at a draw ratio of greater than 2000, in order to obtain hollow fibers which are highly oriented and crystallized and have an index of birefringence of greater than $5 \times 10^{-3}$. The hollow fibers are annealed, as required, then cold-stretched at a stretching ratio of 5 to 100% at a temperature below 40° C., preferably at room temperature. The fibers are then hot-stretched at a temperature above 40° C. but below their melting point, preferably at a temperature ranging from 80° to 125° C., and are stretched at a stretching ratio of 100 to 900% to obtain microporous hollow fibers having a porosity of 30 to 90% by volume.

Micropores contained in the so produced oriented hollow fibers assume substantially rectangular shapes in the lengthwise direction of the fibers. The pores further assume a stacked construction in which the pores are contiguous with one another from the inner surface of the fiber to the outer surface of the fiber. The membrane composed of hollow fibers exhibits water permeability which is as great as from 60 to 10,000 (ml/m$^2$ hr mmHg), a human serum albumin permeability of 30 to 100% as measured in the physiological saline solution, and is ideally suited for separating blood components, for example, for fractionating blood into its cellular component and plasma components.

BRIEF DESCRIPTION OF THE DRAWINGS

FIGS. 1 and 2 are scanning-type electron microphotograph ($\times 10,000$) illustrating the outer wall surface and the inner wall surface of a microporous polyethylene hollow fiber of the present invention, in which reference numeral 1 denotes a microfibril, 2 denotes a knotted portion among the microfibrils, 3 denotes a substantially rectangular micropore, and arrows on the left side of the drawings indicate the lengthwise direction of the fiber;

DETAILED DESCRIPTION OF THE INVENTION

Figure 3:
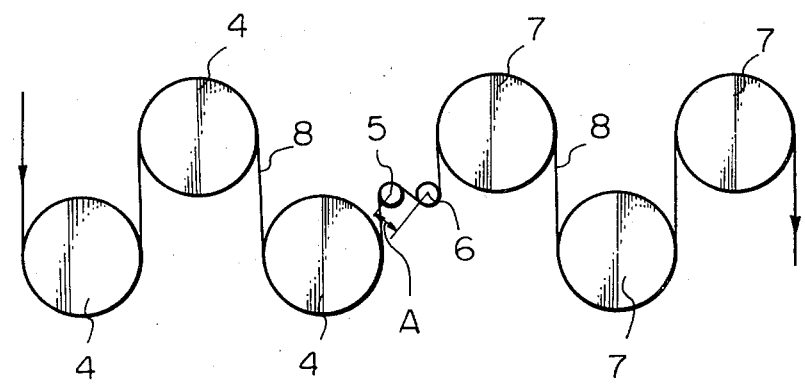
FIG. 3 schematically illustrates a portion of the apparatus used for effecting the cold-stretching in the stretching apparatus used for producing hollow fibers of the present invention, in which reference numerals 4 and 5 denote feed rollers for cold-stretching, 6 and 7 denote take-up rollers for cold-stretching, 8 denotes a hollow fiber, and A represents a section of the fiber's travel path for effecting cold-stretching.

The present invention employs a high-density polyethylene having few branches, the density being greater than 0.960 and preferably greater than 0.965.

The term polyethylene generally represents polymers that are obtained by the polymerization of ethylene. In practice, however, it is a commonly known fact that the polyethylene exhibits physical and chemical properties that vary greatly, depending upon the polymerization methods and the polymerization conditions that are employed, the polyethylene exhibits a high density with very few branches. In other words, the amount of branching and the length of branches change depending upon the polymerization method and the polymerization conditions employed. Depending upon the case, polyethylene exhibits a very small amount of crystallinity and a low density. In effect, the polymer structure, crystalline structure, rate of crystallization, degree of crystallization, resistance against the heat, and resistance against the oxidation, vary so greatly that the polymer often appears to be of quite a different type.

If considered from the standpoint of the polymerization method, even those which are usually called "high-density" polyethylene include polyethylenes that are produced by the so-called medium-pressure method and the low-pressure method. Therefore, the density varies at widely as from about 0.940 to 0.970.

The present invention employs a polyethylene which has a high degree of crystallization, which has few branches, and which has a high density as among the various polyethylenes mentioned above. We have succeeded in obtaining porous hollow fibers having body fluid permeating characteristics, by meltspinning a high-density polyethylene having a density of at least 0.960 or more, preferably a density of 0.965 or more under particular conditions, and by stretching the resulting undrawn hollow fibers. More specifically, we have found that when a high-density polyethylene having a density which is less than 0.960 or a low-density polyethylene, is used, the resulting fibers do not possess the required porous structure, or, even when a porous structure is formed, the pores have such small diameters that they almost completely block the permeation of human serum albumin. Or, the water permeability is low as compared with the porosity, probably due to many pores of an ink-bottle structure which do not completely penetrate through the membrane.

As mentioned above, the porous structure differs depending upon the density of the polymer. This is probably due to the fact that the polymer structure, particularly the membrane of branches and the length of branches differ so greatly that the polyethylene appears to pertain to quite a different kind of polymer, and that the porous structure is varied correspondingly.

According to the present invention, the polyethylene should have a melt index (MI) of from 1 to 15; most desirably, the melt index should lie within a range of from 3 to 7. When the melt index lies within the the above-mentioned range, the porous hollow fibers having a pore diameter as contemplated by the present invention, can be stably produced. With the high-density polyethylene having an MI value of less than 1, the melt viscosity is so great that it is difficult to stably spin the polymer. When the MI value is greater than 15, on the other hand, the fibers can be spun, but the fibers lose stability when they are stretched during subsequent operations.

According to the present invention, high density polyethylene is melt-spun using a nozzle for producing hollow fibers, producing undrawn hollow fibers which are highly oriented and which have a high degree of crystallization. The nozzle should have a double tubular construction to prevent deviation of thickness. The nozzle, however, may have a horse-shoe shape or any other suitable construction.

With the nozzle of the double tubular construction, the air supplied into the hollow fiber to maintain the hollow shape may be naturally or forcibly introduced. When the air is to be forcibly introduced, however, the diameter of the hollow fiber should not become larger than the diameter of the polymer-extruding slit beneath the nozzle. This is to maintain the molecular orientation of the hollow fibers in the lengthwise direction thereof as much as possible beneath the nozzle. In producing the hollow fibers of the present invention, molecular orientation is increased with a decrease in the spinning temperature. From the view point of spinning stability, however, good results are obtained when the temperature ranges from 135° to 215° C. At a spinning temperature in excess of 215° C., the membrane property is greatly decreased—for example, the porosity is greatly decreased.

Spinning at a low temperature is effective for obtaining undrawn hollow fibers that are highly oriented and highly crystallized. In this case, it is desirable to effect the spinning at a high draw ratio. We have found that the spinning draw ratio should be greater than 100, and should preferably be greater than 2,000, and should more preferably be from 3,000 to 10,000. In this case, a spinning cylinder 5 to 30 cm in length is installed beneath the spinning nozzle, and the air for quenching is blown in a countercurrent manner or in the same direction as the spun fibers.

The thus obtained undrawn hollow fibers are highly oriented in the lengthwise direction thereof have an index of birefringence of greater than $5 \times 10^{-3}$ and preferably greater than $10 \times 10^{-3}$ and more preferably $20 \times 10^{-3}$, the inner diameter of the hollow fibers being 50 to 2000 microns, and a wall thickness of 10 to 500 microns. As required, however, the inner diameter of the fibers and the thickness of the wall may be changed beyond these ranges as may be desired. The undrawn hollow fibers may be directly stretched, or they may be stretched after they have been annealed at a temperature of about 110° C. The annealing is performed for about 2 minutes.

It is desirable that the stretching be performed in two stages consisting of cold stretching followed by hot stretching, or the stretching is performed in a plurality of stages consisting of cold stretching and hot stretching which is divided into a plurality of stages. Cold stretching should be effected at a temperature greater than $-100°$ C. but below 40° C., and should preferably be effected at room temperature. In the above-mentioned temperature range. The fibers are cold-stretched at a stretching ratio of 5 to 100% and preferably at a stretching ratio of 5 to 80% at the above-indicated temperatures.

The stretching is performed, for example, by using an apparatus of the type shown in FIG. 3. Referring to FIG. 3, rollers 4 and 5 feed a hollow fiber 8 to a cold-stretching section A have the same circumferential speed of the roller 6 to be faster than that of the roller 5. In performing the stretching, the stretching point is fixed when the section of cold-stretching is short and when the stretching speed is fast; a porous hollow fiber having uniform porosity can be obtained. Preferably the cold-stretching section is shorter than 50 mm, and the cold-stretching speed greater than 50% per minute.

Next the fiber is subjected to the hot stretching consisting of a single stage or a plurality of stages at a temperature range of above 40° C. but lower than 130° C., preferably in the temperature range of 80° to 125° C., and more preferably in the temperature range of 100° C. to 120° C. The pore diameter decreases with a decrease in the stretching temperature; an extremely small pore diameter does not meet the object of the present invention.

The total stretching ratio, which consists of cold stretching and hot stretching, should not exceed 900% and, preferably, should not exceed 700%. When the total stretching ratio exceeds 900%, the fibers are frequently broken during the stretching operation, which greatly deteriorates the stability. We have found that the pore diameter in the porous hollow fiber can be considerably changed if the amount of hot stretching, and the ratio of cold stretching to hot stretching are varied, and hence the human serum albumin permeability and water permeability can be greatly changed.

The thus obtained porous hollow fiber is stable, maintains its shape, and does not necessarily require a thermal setting step to fix the porous structure. However, it is permissible to perform the thermal setting at the same temperature range as that of the hot stretching under the application of tension or without tension, as may be required.

Figure 4:
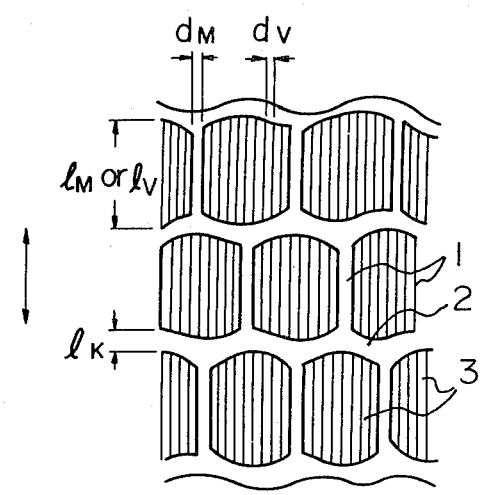
FIG. 4 is a schematic representation of the photomicrographs of FIGS. 1 and 2 in which reference numerals 1, 2, 3 and the arrow on the left side of the drawing are the same as in FIGS. 1 and 2; $d_M$ and $l_M$ indicate respectively the thickness and length of the microfibril, $d_v$ and $l_v$ indicate respectively the width and length of the rectangular pore and $l_k$ is the length of the knotted portion.

The structure and properties of the thus obtained microporous hollow fibers are now described in detail. The surfaces of outer wall and inner wall of the microporous hollow fiber according to the present invention have virtually the same structure as shown in FIGS. 1 and 2. FIG. 4 is a schematic diagram, for each of representation, of FIGS. 1 and 2 which illustrates and explains the pore structure of the hollow fibers of the present invention. A micropore 3 is formed between a microfibril 1 which is oriented in the lengthwise direction of the fiber; a knotted portion 2 is knotted nearly at right angles to the microfibril. Like the microfibrils, the micropores are oriented in the lengthwise direction of the fiber and assume the shape of rectangular holes. The microfibrils have an average thickness $(\overline{d}_M)$ of 0.02 to 0.3 microns and an average length $(\overline{l}_M)$ of 0.5 to 6.0 microns. The knotted portions 2 have an average length $(\overline{l}_k)$ of about 0.1 to about 6.0 microns in the lengthwise direction of the fiber. Further, the ratio of an average length $(\overline{l}_v)$ to an average width $(\overline{d}_v)$ of the rectangular pores is within the range of from about 3 to about 50, and the ratio $\overline{d}_v/\overline{d}_M$ of the width of the pores to the thickness of the microfibrils is within the range of from about 0.3 to about 5.0. It will be seen that the pores present in the hollow fibers of the present invention have a distinguished, characteristic shape.

FIGS. 1 and 2 illustrate the pore structure of the surfaces of the hollow fiber. Observation through an electron microscope indicates that the cross section of the hollow fiber which is cut along the lengthwise direction of the fiber also has the same structure. Namely, micropores in the hollow fiber of the present invention are stacked in the direction of thickness of the membrane shown in FIG. 1. Therefore both the outer surface and the inner surface of the fiber have the same structure.

Since the surfaces and the interior of the fiber both possess a highly opened porous structure, the fiber is highly water and albumin permeable. The polyethylene hollow fiber of U.S. Pat. No. 4,020,230 containing pores of fairly large diameters (0.1 to 1.0 microns), the albumin permeability is low probably due to very small pores in the surface of the fiber. By selecting the appropriate preparation conditions, especially the stretching temperature and the stretching ratio, it is possible to obtain a microporous hollow fiber with a porosity of 30 to 90% by volume and an average pore diameter of 0.1 to 3.0 microns as measured by the mercury porosimetry method.

Despite its high porosity, the microporous hollow fibers of the present invention have microfibrils that are oriented in the lengthwise direction of the fiber. Therefore, the fibers of the present invention exhibit substantial mechanical strength and are apt to be less damaged when a separator module is produced. The hollow fiber of the present invention exhibits substantial water permeability depending upon the porosity and the pore diameter, the water permeability varying from 60 to 10,000 (ml/m² hr mmHg). Further, the hollow fibers of the present invention exhibit a permeability of 30 to 100% for human serum albumin dissolved in a physiological saline solution.

For the purpose of fractionating of whole blood into its plasma and cellular components, we recommend using a hollow fiber having an albumin permeability of about 60 to 100% and a water permeability of at least 1000 or more. This is because, in the case of a plasma separator, the serum proteins must be completely recovered into the plasma. For separating various proteins in the plasma, on the other hand, we recommend using a hollow fiber having a relatively low albumin permeability. The hollow fiber of the present invention is particularly suited for use as the plasma separator.

Namely, with the conventional membrane, a protein cake is formed on the surface of the membrane when the blood is allowed to flow into the hollow fiber and the plasma is separated as a filtrate; i.e., the rate of filtration is decreased, and the protein permeability is decreased with time. With the hollow fiber of the present invention, however, the rate of filtration can be stably maintained for extended periods of time with a low filtering pressure. Although the reason for this fact is not yet clear, it is believed that the microfibrils and rectangular pores that are oriented in the lengthwise direction of the fiber, which constitute a feature of the present invention, are effective to prevent the formation of a protein cake.

The hollow fibers of the present invention are suited not only for filtrating components of body fluids as are mentioned above, but they are suited for any other fields of applications for separating effective proteins, enzymes, vitamins, virus, fungi and bacteria of the order of microns in size, as well as for performing ultrafiltration or microfiltration.

The hollow fibers of the present invention are distinguished from the hollow fiber disclosed in the U.S. Pat. No. 4,020,230 with respect to the membrane structure and the albumin permeability as mentioned above. Moreover, the hollow fiber of the present invention exhibits greatly improved gas permeability and water permeability. According to Table 1 in the specification of U.S. Pat. No. 4,020,230, the hollow fiber having the greatest gas permeability and water permeability possesses a gas permeation rate (GPR) of $9 \times 10^{-3}$ and an ultrafiltration rate (UFR) of 148. If these values are converted into measurement units employed in the present invention as mentioned below, the GPR is 25,000 and the UFR is 29.6. The hollow fiber of the present invention, however, provides excellent gas and water permeability, exhibiting a UFR of greater than 65 and a GPR of greater than $3 \times 10^{+4}$, preferably greater than $5 \times 10^{+4}$, and more preferably greater than $1 \times 10^{+5}$.

The present invention will be explained in further detail with reference to the following nonlimiting working examples. In the present invention, however, measurements are taken in accordance with the methods mentioned below.

(1) Density: The polyethylene is melted and cooled to room temperature at the rate of from 20° C. to 30° C. per minutes. The sample is then heattreated at 120° C. so that the density is substantially uniform, and the density of this sample is measured in accordance with the ASTM-D1505.

(2) Melt index (MI): Measured in accordance with the ASTM-D1238.

(3) Porosity and distribution of pore diameter: Measured using a mercury porosimeter, Model 221, manufactured by Carlo Erba SpA.

(4) $N_2$ gas permeability: 50 porous hollow fibers are bundled in a U-shape, and open portions of the hollow fiber are solidified with an urethane resin to prepare a module. The length in which the fibers are embedded in the resin is 2.5 cm, and the effective length of the hollow fibers is 5 cm.

Nitrogen gas at a pressure of 760 mmHg is applied into the inner side of the hollow fibers of the module at a temperature of 25° C., to measure unit amount of nitrogen gas that escapes through the walls of the hollow fibers. The membrane areas of the inner surfaces are taken into consideration. The hollow fibers having small inner diameters show a large pressure loss. The hollow fibers have such a small inner diameter (300 microns or less) are,, therefore, measured by changing the length of the module, and are extrapolated to the case of zero pressure loss to find a true value. The gas permeation rate (GPR) is denoted by GPR in units of (l/m² hr 760 mmHg).

(5) Water permeability: A module is prepared as in the above-mentioned measurement of $N_2$ gas permeability. 100 hollow fibers are bundled. The fibers are embedded in the resin 4 cm, and the effective length of the hollow fibers is 9 cm. The module is immersed in a mixed solvent consisting of ethanol and water (75/25 v/v) for 30 minutes to make it hydrophilic, and is then sufficiently washed with deionized water. The module having hydrophilic property is not dried, but is placed under a hydraulic pressure of 760 mmHg, to measure a unit amount of water which has infiltrated into the interior of the hollow fibers. The membrane areas of the inner surfaces are considered. The ultrafiltration rate or water permeability is denoted by UFR in a unit of (ml/m².hr.mmHg).

(6) Human serum albumin permeability: Using the module mentioned in (5) above, an aqueous solution (feed solution) consisting of 0.1% by weight of human serum albumin (Fraction V, molecular weight 69000, purchased from Sigma Co.) dissolved in physiological saline solution is filtered through the outer wall of the hollow fibers at the pressure of 380 mmHg at room temperature. After 100 ml of the aqueous solution is filtered, the filtrate is sampled. The solute concentration of the filtrate is determined by finding the absorbancy of light having a wavelength 280 microns by using a double-beam spectrophotometer (UV-202) of Shimazu Co. Further, the human serum albumin permeability is calculated according to the following equation, $$\text{Permeability} = \frac{\text{Solute concentration of permeated liquid}}{\text{Solute concentration of feed solution}} \times 100\%$$

(7) Rejection of blue dextran: Using the module mentioned in (5) above, an aqueous solution (feed solution) containing 0.05% by weight blue dextran (No. 2000, molecular weight 2,000,000 product of Pharmacia Fine Chemicals Co.) is filtered. Other conditions are the same as the measurement of human serum albumin permeability mentioned in (6) above. Here, the measurement is taken by the spectrophotometer at a wavelength of 254 microns, and the calculation is carried out in accordance with the following equation, $$\text{Rejection} = \frac{\text{Solute concentration of feed solution} - \text{solute concentration of permeated solution}}{\text{Solute concentration of feed solution}} \times 100\%$$

(8) Index of birefringence (Δn): Measured in the usual manner using a polarization microscope manufactured by Nikon Kogaku Co.

(9) Elastic recovery factor: The elastic recovery factor is measured using a fiber having a length of 2 cm by using a Tensilon, Model UMT-II, manufactured by Toyo Bowldwin Co., at a test speed of 1 cm per minute, and is determined according to the following equation, $$\text{Elastic recovery factor (ER}_{50}) = \frac{\text{Fiber length when stretched by 50\%} - \text{Fiber length when the load being stretched by 50\% returns to zero}}{\text{Fiber length when stretched by 50\%} - \text{Fiber length before it is stretched}} \times 100$$

EXAMPLE 1

A high-density polyethylene (HI-ZEX 2200J, a product of Mitsui Petrochemical Co.) having a density of 0.968 g/cm$^3$ and a melt index of 5.5, was spun using a spinneret having a double-tubular construction with a polymer extruding port diameter of 25 mm, an annular slit width of 1.0 mm, and a cross-sectional area for extruding of 0.754 cm$^2$, while introducing air by the self-sucking system, at a spinning temperature of 145° C. and an extruding line speed of 10.5 cm per minute. A spinning cylinder 20 cm long was installed at the spinning port, and the fiber was taken up at a take-up speed of 600 m/min. at a spinning draw ratio of 5714 while cooling the fiber with the air at 20° C. at a wind velocity of 1.5 m/sec. in a counter-current manner. The thus obtained unstretched hollow fiber measured 210 microns in inner diameter, 27 microns in wall thickness, and exhibited an index of birefringence Δn of 39×10$^{-3}$. The elastic recovery factor, however was as small as 36%. The unstretched hollow fiber was then allowed to pass on the roller heated at 110° C. to effect the annealing, the time in which the fiber was in contact with the roller being 120 seconds. The thus annealed unstretched hollow yarn exhibited an index of birefringence Δn of 40×10$^{-3}$ and an elastic recovery factor of 39%.

The annealed yarn was then cold-stretched at a stretching ratio of 30% by rollers maintained at room temperature, and hot-stretched by the rollers in a box heated at 110° C. until the total stretching ratio was 240%, then thermally set in a box heated at 110° C. for 20 seconds, thereby continuously producing a porous hollow fiber. The thus obtained porous polyethylene hollow fiber had been stretched 3.4 times relative to the unstretched fiber, possessed an inner diamter of 193 microns and a wall thickness of 26 microns, and exhibited a very uniform whitening degree, an average pore diameter of 0.52 microns as measured by a mercury porosimeter, a porosity of 65%, an UFR of 2040, and a GPR of 7.2×10$^{+5}$.

The porous polyethylene hollow fiber exhibited a human serum albumin permeability of 95.5% and a blue dextran rejection of 96.0%, thus offering very sharp separating characteristics. Further, the porous hollow fiber exhibited a very narrow distribution of pore diameter and very high porosity, presenting practically excellent properties. The experimental results are as shown in Tables 1 and 2. The results of the hollow fibers obtained by changing various factors including the polymer density, MI value, draw ratio and stretching conditions, are also shown in Tables 1 and 2.

EXAMPLE 2

Polyethylene (HI-ZEX 2208J, a product of Mitsui Petrochemical Co.) having a density of 0.968 g/cm$^3$ and a melt index 5.5 was spun and stretched under virtually same conditions as in Experiment No. 1. In this experiment, a spinneret having a double-tubular construction with a polymer extruding port diameter of 25 mm and an annular slit width of 3 mm (area of extruding port: 2.07 cm$^2$) was used. The detailed experimental conditions, the pore structure dimensions and the hollow fiber properties are all shown in Table 3 and Table 4.

TABLE 1

| | Spinning conditions | | | | | | Properties of unstretched yarns | | | |
|---|---|---|---|---|---|---|---|---|---|---|
| | Polymer | | Area of extruding port of | | | | Inner | Wall | | |
| Experiment No. | Density (g/cm$^3$) | MI value | spinneret (cm$^2$) | Tsp (°C.) | Vsp (m/min) | spinning draw ratio | diameter (μ) | thickness (μ) | Δn | ER$_{50}$ (%) |
| 1 | 0.968 | 5.5 | 0.754 | 145 | 600 | 5714 | 210 | 27 | 39 × 10$^{-3}$ | 36 |
| 2 | 0.965 | 5.0 | 0.754 | 145 | 600 | 5714 | 210 | 27 | ND*$^1$ | ND |
| 3 | 0.961 | 8.0 | 0.754 | 145 | 600 | 5714 | 210 | 27 | ND | ND |
| 4 | 0.966 | 1.1 | 0.754 | 160 | 600 | 5714 | 210 | 27 | ND | ND |
| 5 | 0.965 | 14.0 | 0.754 | 145 | 600 | 5714 | 210 | 27 | ND | ND |
| 6 | 0.957 | 0.3 | 0.754 | 200 | 600 | 5714 | 210 | 27 | ND*$^3$ | ND |
| 7 | 0.950 | 6.5 | 0.754 | 145 | 600 | 5714 | 210 | 27 | 35 × 10$^{-3}$ | ND |
| 8 | 0.968 | 5.5 | 0.754 | 170 | 400 | 3809 | 230 | 27 | 33 × 10$^{-3}$ | 32 |
| 9 | 0.968 | 5.5 | 0.754 | 160 | 600 | 5714 | 210 | 27 | ND | ND |
| 10 | 0.955 | 20 | 0.754 | 140 | 600 | 5714 | 210 | 27 | ND | ND |
| 11 | 0.961 | 0.1 | 0.754 | spinning tension was so great that the spinning was not effected. | | | | | | |
| 12 | 0.968 | 5.5 | 0.754 | 145 | 600 | 5714 | 210 | 27 | ND | ND |
| 13 | 0.968 | 5.5 | 0.754 | 145 | 1000 | 9523 | 180 | 18 | ND | ND |
| 14 | 0.968 | 5.5 | 0.754 | 145 | 300 | 2857 | 230 | 35 | ND | ND |
| 15 | 0.968 | 5.5 | 1.45*$^5$ | 145 | 200 | 3663 | 280 | 35 | ND | ND |

| Experiment No. | Percentage of cold-stretching (%) | Stretching conditions Hot-stretching temperature (°C.) | Total percentage of stretching (%) | Note |
|---|---|---|---|---|
| 1 | 30 | 110 | 240 | |
| 2 | 30 | 110 | 240 | |
| 3 | 30 | 110 | 160 | |

TABLE 1-continued

| | | | | |
|---|---|---|---|---|
| 4 | 30 | 110 | 240 | |
| 5 | 30 | 110 | 120 | |
| 6 | 30 | 110 | 100 | Not included in the present invention[*2] |
| 7 | 30 | 110 | 160 | Same as above |
| 8 | 30[*4] | 110 | 400 | |
| 9 | 30[*4] | 110 | 600 | |
| 10,11 | The fiber yarn was so weak that the stretching was not effected. | | Not included in the present invention Same as above | |
| 12 | 30 | 110 | 200 | |
| 13 | 30 | 110 | 200 | |
| 14 | 30 | 110 | 200 | |
| 15 | 30 | 110 | 200 | |

| | Polymer | | Spinning conditions | | | | Properties of unstretched yarns | | | |
|---|---|---|---|---|---|---|---|---|---|---|
| Experiment No. | Density $(g/cm^3)$ | MI value | Area of extruding port of spinneret $(cm^2)$ | Tsp (°C.) | Vsp (m/min) | spinning draw ratio | Inner diameter ($\mu$) | Wall thickness ($\mu$) | $\Delta n$ | $ER_{50}$ (%) |
| 16 | 0.968 | 5.5 | 0.754 | 145 | 600 | 5714 | 210 | 27 | $39 \times 10^{-3}$ | 36 |
| 17 | 0.968 | 5.5 | 0.754 | 145 | 600 | 5714 | 210 | 27 | $39 \times 10^{-3}$ | 36 |
| 18 | Same as Experiment No. 1, but the unstretched fiber was not annealed. | | | | | | | | | |
| 19 | 0.968 | 5.5 | 0.754 | 145 | 600 | 5714 | 210 | 27 | $39 \times 10^{-3}$ | 36 |
| 20 | 0.968 | 5.5 | 0.754 | 145 | 600 | 5714 | 210 | 27 | $39 \times 10^{-3}$ | 36 |
| 21 | 0.968 | 5.5 | 0.754 | 145 | 600 | 5714 | 210 | 27 | $39 \times 10^{-3}$ | 36 |
| 22 | 0.968 | 5.5 | 0.754 | 145 | 600 | 5714 | 210 | 27 | $39 \times 10^{-3}$ | 36 |
| 23 | 0.968 | 5.5 | 0.754 | 145 | 600 | 5714 | 210 | 27 | $39 \times 10^{-3}$ | 36 |
| 24 | 0.968 | 5.5 | 0.754 | 145 | 600 | 5714 | 210 | 27 | $39 \times 10^{-3}$ | 36 |

| Experiment No. | Percentage of cold-stretching (%) | Stretching conditions Hot-stretching temperature (°C.) | Total percentage of stretching (%) | Note |
|---|---|---|---|---|
| 16 | 0 | 110 | 240 | Not included in the present invention |
| 17 | 100 | [*6] | 100 | same as above |
| 18 | | | | |
| 19 | 20 | 110 | 240 | |
| 20 | 20 | 110 | 200 | |
| 21 | 20 | 110 | 160 | |
| 22 | 20 | 110 | 100 | |
| 23 | 20 | 110 | 80 | Not included in the present invention |
| 24 | 20 | 110 | 60 | same as above |

[*1]Not determined
[*2]The porous hollow fiber appeared to contain whitened portions and transparent portions in a mixed manner.
[*3]Value obtained from an annealed fiber
[*4]The section of cold-stretching was 7mm, and the stretching speed was 214% per minute.
[*5]Spinning nozzle was changed
[*6]Hot-stretching was not effected

TABLE 2

| Experiment No. | Inner diameter ($\mu$) | Wall thickness ($\mu$) | Average pore diameter ($\mu$) | Porosity (%) | GPR | UFR | Human serum albumin permeability (%) | Blue dextran rejection (%) | Note |
|---|---|---|---|---|---|---|---|---|---|
| 1[*4] | 193 | 26 | 0.52 | 65 | $7.2 \times 10^5$ | 2040 | 96 | 96 | |
| 2 | 190 | 25 | ND | 60 | ND | 1630 | 87 | 97 | |
| 3 | 200 | 26 | ND | 42 | ND | 278 | 35 | 100 | |
| 4 | 192 | 26 | ND | 48 | ND | 664 | 70 | 100 | |
| 5 | 205 | 26 | ND | 44 | ND | 386 | 44 | 100 | |
| 6 | 205 | 26 | ND | 31 | ND | 48.7 | 20 | 97 | Not included in the present invention |
| 7 | 200 | 26 | ND | 8 | ND | NG[*2] | ND | ND | same as above |
| 8[*1] | 179 | 25 | 0.82 | 73.4 | $1.3 \times 10^6$ | 4210 | 100 | 50 | |
| 9 | 160 | 23 | 1.20 | 75.5 | $1.8 \times 10^6$ | 9520 | 100 | 0 | |
| 12 | 196 | 25 | ND | 61 | ND | 1330 | 85 | 99 | |
| 13 | 170 | 16 | ND | 65 | ND | 1970 | 93 | 96 | |
| 14 | 210 | 30 | ND | 45 | ND | 408 | 72 | 100 | |
| 15 | 250 | 30 | ND | 50 | ND | 789 | 78 | 100 | |
| 16[*3] | 196 | 12 | ND | 0 | ND | ND | ND | ND | Not included in the present invention |
| 17 | 190 | 20 | ND | 38 | ND | 103 | 0 | ND | same as above |
| 18 | 193 | 26 | ND | 51 | ND | 789 | 74 | 99 | |

| | Properties of microporous hollow fibers | | | | Filtering properties of membrane of hollow fibers | | |
|---|---|---|---|---|---|---|---|
| Experiment | Inner diameter | Wall thickness | Average pore diameter | Porosity | Human serum albumin permeability | Blue dextran rejection | |

TABLE 2-continued

| No. | (μ) | (μ) | (μ) | (%) | GPR | UFR | (%) | (%) | Note |
|---|---|---|---|---|---|---|---|---|---|
| 19 | 192 | 25 | ND | 63 | ND | 1960 | 95 | 97 | |
| 20 | 195 | 24 | ND | 61 | ND | 1280 | 87 | 98 | |
| 21 | 200 | 24 | ND | 50 | ND | 754 | 73 | 99 | |
| 22*5 | 200 | 25 | ND | 44 | ND | 263 | 44 | 100 | |
| 23 | 204 | 20 | ND | 38 | ND | 104 | 23 | 100 | Not included in the present invention |
| 24 | 206 | 25 | ND | 31 | ND | 19.7 | 10 | 100 | same as above |

*[1] Index of birefringence of porous hollow fiber was $37 \times 10^{-3}$. From a scanning-type electron microphotograph, the porous structure of the outer surface of the microporous hollow fiber was as follows:
$\bar{d}_M$: 0.1 micron $\bar{l}_M$: 1.5 micron $\bar{l}_k$: 0.6 micron
$\bar{d}_\nu$: 0.12 micron $\bar{l}_\nu/\bar{d}_\nu$: 12 $\bar{d}_\nu/\bar{d}_M$: 1.2
*[2] Negligibly small.
*[3] The obtained hollow fiber was not whitened but remained transparent.

| | $\bar{d}_M$ (μ) | $\bar{l}_M$ (μ) | $\bar{l}_k$ (μ) | $\bar{l}_\nu/\bar{d}_\nu$ | $\bar{d}_\nu/\bar{d}_M$ |
|---|---|---|---|---|---|
| *4 | 0.04 | 0.8 | 0.5 | 12 | 1.6 |
| *5 | 0.13 | 1.4 | 0.3 | 14 | 0.8 |

TABLE 3

| | Spinning Conditions | | | Δn of unstretched fiber | Stretching conditions | | | Fiber dimensions | |
|---|---|---|---|---|---|---|---|---|---|
| Exp. No. | Tsp (°C.) | Vsp (m/min.) | Draft ratio | | Cold-Stretch (%) | Hot-Stretch Temp. (°C.) | Total Stretch (%) | Inner diam. (μ) | Wall thickness (μ) |
| 25 | 170 | 300 | 4007 | $16 \times 10^{-3}$ | 50 | 105 | 300 | 250 | 50 |
| 26 | 170 | 200 | 2672 | $21 \times 10^{-3}$ | 50 | 103 | 350 | 270 | 60 |
| 27 | 170 | 150 | 2004 | $39 \times 10^{-3}$ | 50 | 95 | 450 | 300 | 60 |

TABLE 4

| | Membrane Structure | | | | | | | Membrane Properties | | | |
|---|---|---|---|---|---|---|---|---|---|---|---|
| Exp. No. | Av. pore dia. (μ) | porosity (%) | $\bar{d}_M$ (μ) | $\bar{l}_M$ (μ) | $\bar{l}_K$ (μ) | $\bar{l}_\nu/\bar{d}_\nu$ | $\bar{d}_\nu/\bar{d}_M$ | GPR | UFR | Albumin perm. (%) | Dextran rej. (%) |
| 25 | 0.34 | 64 | 0.06 | 0.9 | 0.3 | 8.9 | 1.5 | $4.9 \times 10^5$ | 1900 | 100 | 99 |
| 26 | 0.51 | 67 | 0.08 | 1.7 | 0.5 | 11 | 2.1 | $7.2 \times 10^5$ | 3800 | 100 | 98 |
| 27 | 0.62 | 70 | 0.10 | 1.3 | 0.7 | 4.8 | 2.5 | $6.5 \times 10^5$ | 3200 | 100 | ND*[1] |

*[1] Non-determined

COMPARATIVE EXAMPLE 1

High-density polyethylene (HI-ZEX 5000B, a product of Mitsui Petrochemical Co.) having a density of 0.957 g/cm³ and a melt index of 0.3 was spun by using a C-shaped hollow fiber-forming spinneret having a polymer extruding port diameter of 2 mm, a slit width of 0.3 mm and a width of the non-continuous portion of 0.3 mm, at a spinning temperature of 230° C., at extruding line speed of 150 cm/min., at a take-up speed of 200 m/min., and a spinning draw ratio of 800, all in accordance with Example 3 which is disclosed in Japanese Patent Application Laid-Open No. 137026/77.

The unstretched hollow fiber so produced measured 40 microns in inner diameter, 12 microns in wall thickness, and exhibited an index of birefringence of $23 \times 10^{-3}$ and an elastic recovery factor of 39%. The unstretched hollow fiber was allowed to pass over a roller heated at 110° C. to effect annealing, the time in which the fiber contacted with the roller being 60 seconds. The annealed, unstretched hollow fiber exhibited an index of birefringence Δn of $24 \times 10^{-3}$ and an elastic recovery factor of 43%. The annealed fiber was then cold-stretched at a stretching ratio of 30% between the rollers maintained at 25° C., and was hot-stretched between the rollers in a box heated at 115° C. until the total stretching ratio was 80%, and was then thermally set between the rollers in a box heated at 120° C. for 60 seconds, thereby to prepare a porous hollow fiber.

The hollow fiber so produced had an inner diameter of 36 microns and a wall thickness of 10 microns, and easily absorbed ethanol, indicating the presence of open pores. Measurement by means of a mercury porosimeter indicated a porosity of 23% and an average pore diameter of 0.1 micron, most of the pore diameter being distributed within a range of from 0.02 to 0.2 microns. The GPR was 3000, and the UFR was 7.9. Further, human serum albumin permeability was 13%, and blue dextran rejection was 97%.

EXAMPLE 3

By using the hollow fibers obtained from No. 25 of Example 2, a cylindrical module of the type of artificial kidney for dialysis was prepared (number of hollow fiber, 6800; effective length, 14.5 cm; membrane area, 0.77 m²), the openings of the hollow fibers being faced to both ends.

Heparinized calf's blood was introduced into a beaker, maintained at a temperature of 37° C., slowly agitated by a stirrer, pumped into the hollow portions of the hollow fibers in the module, and the blood rich in blood cellular components obtained from the outlet port of the module was returned to the beaker. On the other hand, the plasma which has permeated through the membrane of hollow fiber was recovered from the module using another pump, and was returned to the beaker. The operation for blood circulation was continued for about 3 hours to measure the change in the transmembrane pressure ($P_{TM}$) with the increase in the plasma permeating rate QF and the change in the amount of albumin and proteins contained in the plasma. The results obtained are as shown in Table 5.

The flow rate of the blood into the module was maintained at 100 m/min., and the transmembrane pressure was found in accordance with the following equation, $$P_{TM} = \frac{1}{2}(P_i + P_o) - P_F$$

where, $P_i$ = blood pressure at the inlet port of the module,
$P_o$ = blood pressure at the outlet port of the module,
$P_F$ = pressure on the filtrate (plasma) side.

TABLE 5

| Time from the start of experiment (min.) | $Q_F$ (ml/min.) | $P_{TM}$ (mmHg) | Albumin permeability (%) | Total protein permeability (%) |
|---|---|---|---|---|
| 35 | 5 | 4 | 94 | 87 |
| 65 | 10 | 9 | 97 | 92 |
| 95 | 15 | 11 | 97 | 91 |
| 125 | 20 | 16 | 97 | 88 |
| 155 | 29 | 27 | 97 | 92 |
| 185 | 35 | 50 | 91 | 85 |

No blood cellular component was contained in the filtrate, and no hemolysis took place during the experiment.

The above results evidence the fact that the hollow fibers of the present invention are effective for producing a membrane for plasma separators.

What is claimed is:

1. A high-density polyethylene microporous hollow fiber which is oriented in the lengthwise direction of the fiber, said hollow fiber having:
   (a) rectangular pores formed by microfibrils that are oriented in the lengthwise direction of the fiber and knotted portions that are connected to said microfibrils substantially at right angles thereto, the pores being contiguous with each other from the inner wall surface to the outer wall surface to form a stacked, multicellular structure;
   (b) a porosity of about 30 to about 90% by volume;
   (c) a water permeability through the wall of at least about 65 (ml/m².hr.mmHg); and
   (d) a human serum albumin permeability of at least about 30% as measured in a physiological saline solution.

2. A microporous hollow fiber according to claim 1 wherein the microfibrils have an average thickness ($\bar{d}_M$) of about 0.02 to 0.3 microns and an average length ($\bar{l}_M$) of about 0.5 to 6.0 microns,
   the knotted portions have an average length ($\bar{l}_K$) of about 0.1 to 6.0 microns in the lengthwise direction of the fiber,
   the ratio of the average length ($\bar{l}_V$) to an average width ($\bar{d}_V$) of the rectangular pores is within the range of from about 3 to 50, and
   the ratio $\bar{d}_V/\bar{d}_M$ of the width of the pores to the thickness of the microfibrils is within the range of about 0.3 to 5.0.

3. The microporous hollow fiber according to claim 1 or 2, wherein said hollow fiber is made from a high-density polyethylene having a density of at least 0.960.

4. The microporous hollow fiber according to claim 3 wherein said hollow fiber is made from a high-density polyethylene having a density of at least 0.965.

5. The microporous hollow fiber according to claim 1 or 2, wherein water permeability through the wall of the hollow fiber is at least about 300 (ml/m².hr.mmHg).

6. A microporous hollow fiber according to claim 1 or 2, wherein water permeability through the wall of the hollow fiber is at least 1000 (ml/m².hr.mmHg) and the human serum albumin permeability is at least 60% as measured in a physiological saline solution.

7. A microporous hollow fiber according to claim 1 made from polyethylene having a melt index of from at least 1 up to 15.

8. A microporous hollow fiber according to claim 7 made from a polyethylene having a melt index of from about 3 to about 7.

9. A high-density polyethylene microporous hollow fiber membrane which is oriented in the lengthwise direction of the fiber, said hollow fiber membrane having:
   (a) rectangular pores formed by microfibrils that are oriented in the lengthwise direction of the fiber and knotted portions that are connected to said microfibrils substantially at right angles thereto, the pores being contiguous with each other from the inner wall surface to the outer wall surface to form a stacked, multicellular structure;
   (b) a porosity of about 30 to about 90% by volume;
   (c) a water permeability through the wall of at least about 65 (ml/m².hr.mmHg); and
   (d) a human serum albumin permeability of at least about 30% as measured in a physiological saline solution.

* * * * *